United States Patent
Sato

(10) Patent No.: US 11,290,277 B2
(45) Date of Patent: Mar. 29, 2022

(54) DATA PROCESSING SYSTEM

(71) Applicant: HITACHI, LTD., Tokyo (JP)

(72) Inventor: Hisayoshi Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 791 days.

(21) Appl. No.: 16/076,062

(22) PCT Filed: Feb. 18, 2016

(86) PCT No.: PCT/JP2016/054719
§ 371 (c)(1),
(2) Date: Aug. 7, 2018

(87) PCT Pub. No.: WO2017/141399
PCT Pub. Date: Aug. 24, 2017

(65) Prior Publication Data
US 2021/0194694 A1    Jun. 24, 2021

(51) Int. Cl.
| H04L 29/06 | (2006.01) |
| G06F 21/00 | (2013.01) |
| H04L 9/32  | (2006.01) |
| G06F 21/64 | (2013.01) |
| H04L 9/08  | (2006.01) |

(52) U.S. Cl.
CPC ............ *H04L 9/3228* (2013.01); *G06F 21/64* (2013.01); *H04L 9/0819* (2013.01); *H04L 9/0861* (2013.01)

(58) Field of Classification Search
CPC ... H04L 9/3228; H04L 9/0819; H04L 9/0861; H04L 9/3242; G06F 21/64; G06F 21/6209; G06F 21/602
See application file for complete search history.

(56) References Cited

U.S. PATENT DOCUMENTS

2014/0050318 A1*  2/2014  Hayashi ............... H04L 9/3073
                                                                380/46

FOREIGN PATENT DOCUMENTS

| JP | 2010-114682 A  | 5/2010 |
| JP | 2011-199515 A  | 10/2011 |
| JP | 2016-012897 A  | 1/2016 |
| WO | WO 2012/147869 A1 | 11/2012 |

OTHER PUBLICATIONS

International Search Report, dated May 24, 2016, which issued during the prosecution of International Application No. PCT/JP2016/054719, which corresponds to the present application.

\* cited by examiner

*Primary Examiner* — Lisa C Lewis
(74) *Attorney, Agent, or Firm* — Baker Botts L.L.P.

(57) ABSTRACT

Provided is a data processing system in which data are uploaded from a user terminal A to data storage server, and data are accessed from a user terminal B. User terminal A and B have a key KA and KB, respectively. Data storage server has a replacement key KA→B. User terminal A generates an authenticator tag with data M and temporary key R, generated by user terminal A, and generates a key k with temporary key R and key KA. User terminal A transmits data M, key k, and authenticator tag to the data storage server. Data storage server generates a key k' from key k and replacement key KA→B, and transmits data M, key k', and the message authenticator tag to user terminal B. User terminal B generates temporary key R with key k' and key KB and generates an authenticator tag' to compare with the received authenticator tag.

4 Claims, 14 Drawing Sheets

DATA PROCESSING SYSTEM

CROSS REFERENCE TO PRIOR APPLICATIONS

This application is a U.S. National Phase application under 35 U.S.C. § 371 of International Application No. PCT/JP2016/054719, filed on Feb. 18, 2016. The International Application was published in Japanese on Aug. 24, 2017 as WO 2017/141399 A1 under PCT Article 21(2). The contents of the above application are hereby incorporated by reference.

TECHNICAL FIELD

The present invention relates to a data processing system, and more particularly, to a data processing system suitable for verifying the integrity of data without imposing a heavy processing load in the case of depositing data in a cloud service or the like.

BACKGROUND ART

In recent years, use of an operation management form called a cloud has been expanding for the purpose of, for example, increasing the efficiency of information system development and reducing operation and management costs. A cloud service allows a user to outsource an information system without retaining its own information system. However, while efficiency and cost reduction are achieved, a user has a concern about leakage of confidential information to a third party including an external contractor or falsification of information. This is because in cloud services, an information system is managed by a business operator different from a user who uses the information system.

Encryption technology is effective against leakage of confidential information and falsification of information. It is possible to achieve these security requirements by means of conventional techniques such as AES encryption, a message authenticator, and a digital signature.

Meanwhile, as application of information systems expands, there is a movement to also provide a communication function to sensors, embedded devices, and the like simply having a capacity lower than the computing capacity of ordinary computers, to cause the sensors, embedded devices, and the like to perform information gathering and others (referred to as, for example, Internet of things (IoT)). Information collected is useful, but may include information on personal privacy in some cases. Therefore, it is necessary to ensure the confidentiality and integrity of the information. However, since sensors and the like generally have a low computing capacity, it is currently undesirable to apply public key encryption technology using a digital signature or the like in consideration of efficiency.

Common key encryption technology is suitable for the above-described situation in terms of an implementation scale and processing efficiency. However, since a key is used in common for encryption/decryption and generation/verification of a message authenticator, there arises a problem of sharing the key between a sender and a receiver in the case where the sender and the receiver are different. Additionally, in the case where a large number of users (sensors) are involved, it is also undesirable to use the same key since this leads to security vulnerability. Accordingly, it is necessary to provide a system in which each user uses a separate key.

In a system in which information is transmitted/received and shared via a cloud, it is conceivable to utilize computational resources on the cloud. In the case of operating an information sharing system based on the above-described individual keys by using the common key encryption technology, it is conceivable that all individual keys are collectively held by a cloud administrator, and are transmitted after decryption or regeneration of a message authenticator. However, in the outsourcing of computational resources, such as a cloud service, the administrator thereof is an outsider. It is thus difficult to provide a strong guarantee against leakage or falsification of information. Therefore, a method is desired, which is free from information leakage to anyone including a cloud administrator, and provides anyone including a cloud administrator with no capability of falsification of information while using computational resources on the cloud.

With respect to various problems as described above, use of a re-encryption technique based on the public key encryption technology can achieve, for example, an assurance of integrity of information and prevention of information leakage by means of individual keys while information leakage to a cloud administrator or the like is prevented. The re-encryption technique based on the public key encryption technology is disclosed in, for example, PTL 1.

CITATION LIST

Patent Literature

PTL 1: WO 2012/147869

SUMMARY OF INVENTION

Technical Problem

In the re-encryption technique described in the above-mentioned PTL 1, a re-encryption device generates a re-encryption key based on a secret key of a first user, a public key of a second user, and a random number. As a result, even in the case where a user and a server administrator collude with each other in the proxy re-encryption system, it is possible to prevent decryption authority from being further transferred without permission from a transfer source.

However, the re-encryption technique based on a public key as described in PTL 1 requires a large processing load. Accordingly, there has been a problem that it is difficult to apply the re-encryption technique to a sensor or the like having poor computational resources in the field of IoT as described above.

Furthermore, the re-encryption technique described in the above-mentioned PTL 1 does not take into consideration how the integrity of data is verified by a user to whom the data have been transferred, either.

The present invention has been made to solve the above-described problems. An object of the present invention is to provide a data processing system which allows a party, to whom data have been transferred, to verify the integrity of the data without imposing a heavy processing load in the case of depositing data, and also allows decryption of data without imposing a heavy processing load in the case of encrypted data.

Solution to Problem

The configuration of a data processing system of the present invention is as follows. Data are uploaded from a user terminal A to a data storage server. The data are accessed from a user terminal B. The user terminal A and the user terminal B have a first unique key and a second unique key, respectively. The data storage server has a replacement key. Then, the user terminal A generates a temporary key, and also generates a message authenticator by using the data and the temporary key. Furthermore, the user terminal A generates a first synthetic key by using the temporary key and the first unique key, and transmits the data, the first synthetic key, and the message authenticator to the data storage server. The data storage server generates a second synthetic key from the received first synthetic key and the replacement key, and transmits the data, the second synthetic key, and the message authenticator to the user terminal B. The user terminal B generates a temporary key by using the received second synthetic key and the second unique key. Furthermore, the user terminal B generates a message authenticator by using the data and the generated temporary key to compare the generated message authenticator and the received message authenticator.

Moreover, another configuration of the data processing system of the present invention is as follows. Data are uploaded from a user terminal A to a data storage server. The data are accessed from a second terminal. The first terminal and the second terminal have a first unique key and a second unique key, respectively. The data storage server has a replacement key. Then, the first terminal generates a temporary key, and also generates encrypted data from plaintext data by using the temporary key. Furthermore, the first terminal generates a first synthetic key by using the temporary key and the first unique key, and transmits the encrypted data and the first synthetic key to the data storage server. The data storage server generates a second synthetic key from the received first synthetic key and the replacement key, and transmits the encrypted data and the second synthetic key to the second terminal. The second terminal generates a temporary key by using the received second synthetic key and the second unique key, and decrypts the encrypted data with the generated temporary key.

Advantageous Effects of Invention

According to the present invention, it is possible to provide a data processing system which allows a party, to whom data have been transferred, to verify the integrity of the data without imposing a heavy processing load in the case of depositing data, and also allows decryption of data without imposing a heavy processing load in the case of encrypted data.

DESCRIPTION OF EMBODIMENTS

Each embodiment according to the present invention will be described below with reference to FIGS. 1 to 14B.

First Embodiment

A first embodiment of the present invention will be described below with reference to FIGS. 1 to 13.

First, the system configuration of a data processing system according to the first embodiment of the present invention will be described with reference to FIGS. 1 to 5.

Figure 1:
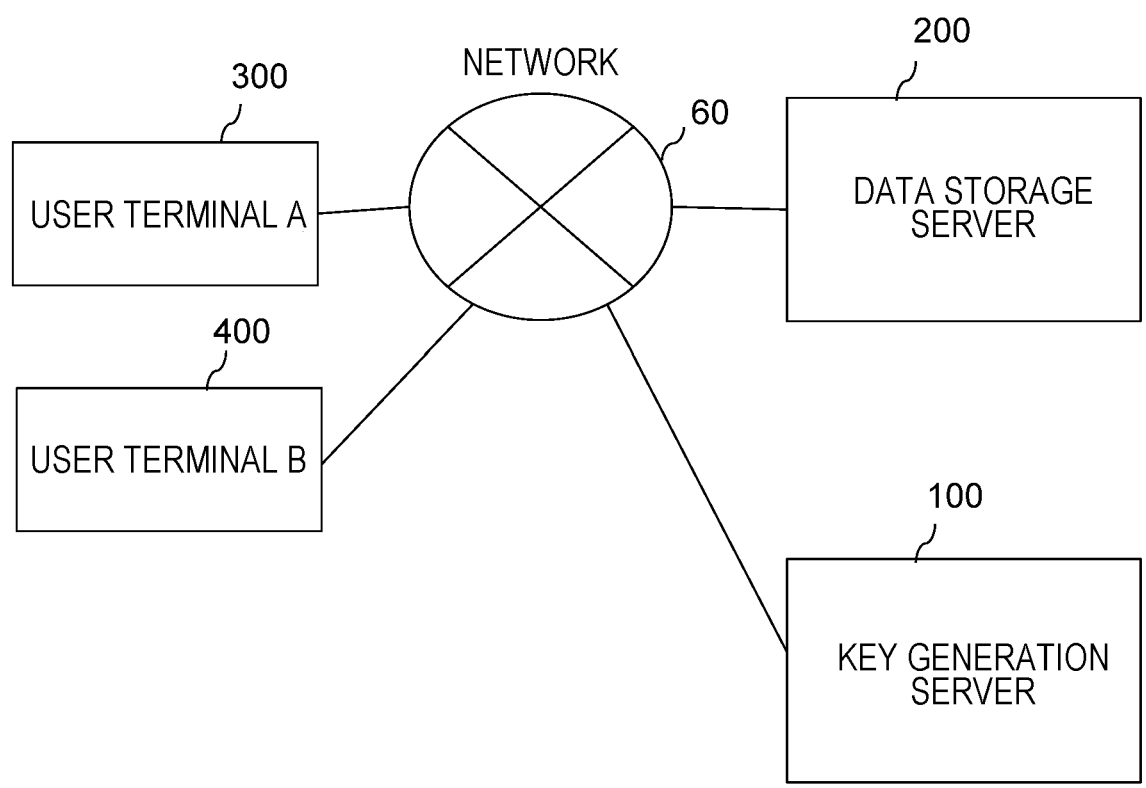
FIG. 1 is a diagram showing the entire configuration of a data processing system according to a first embodiment.

FIG. 1 is a diagram showing the entire configuration of the data processing system according to the first embodiment.

Figure 2:
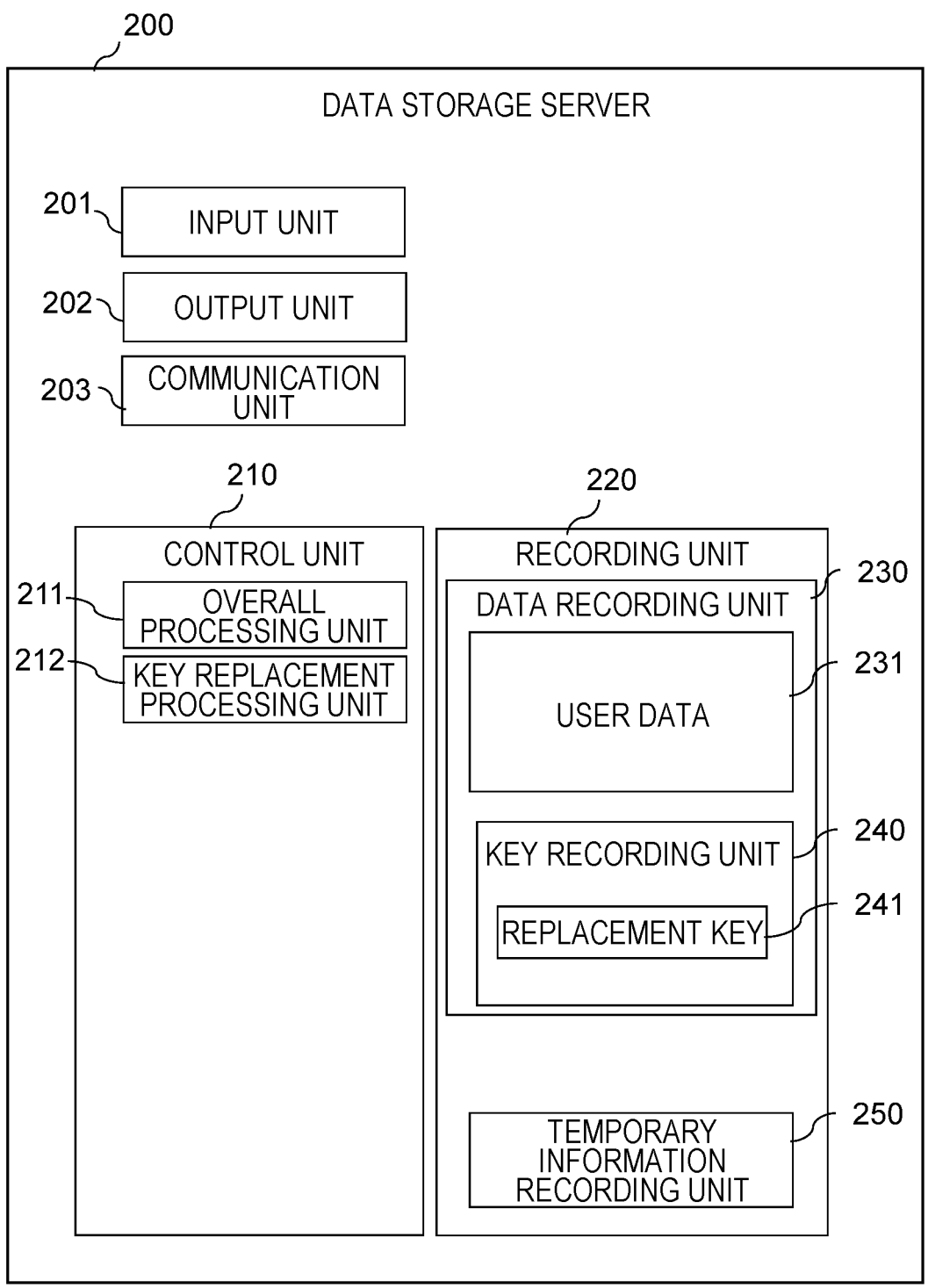
FIG. 2 is a functional configuration diagram of a data storage server.

FIG. 2 is a functional configuration diagram of a data storage server.

Figure 3:
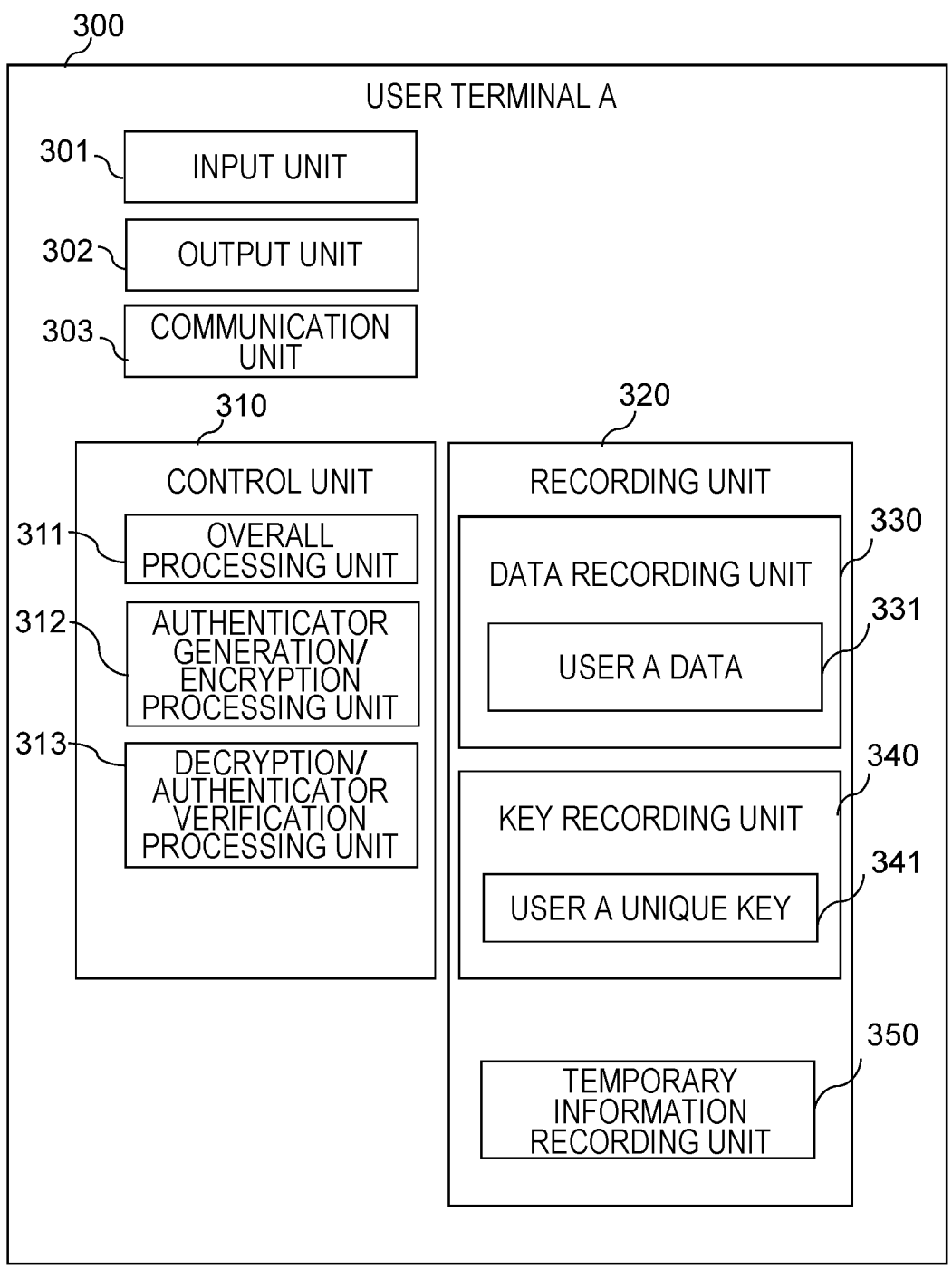
FIG. 3 is a functional configuration diagram of a key generation server.

FIG. 3 is a functional configuration diagram of a key generation server.

Figure 4:
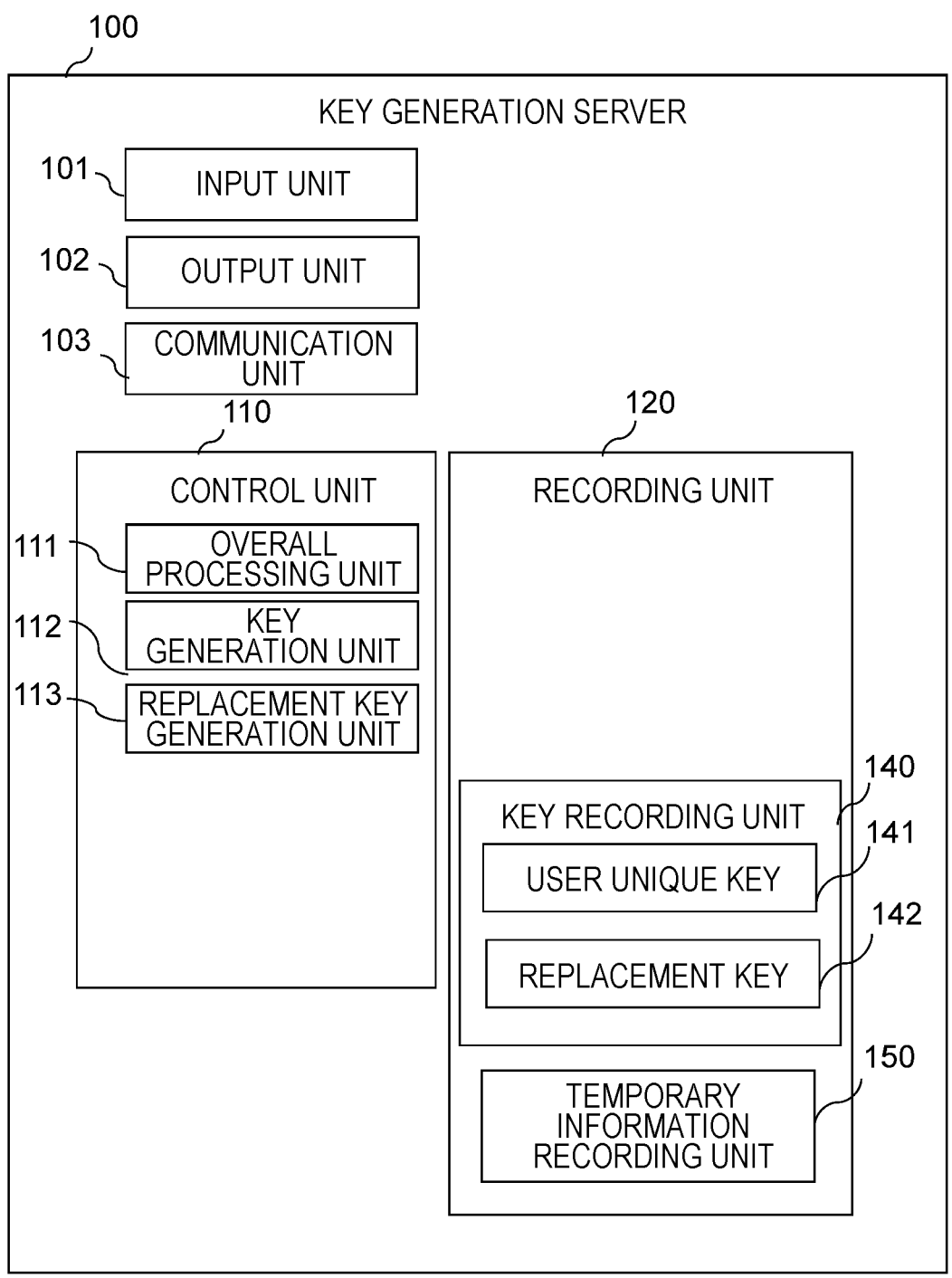
FIG. 4 is a functional configuration diagram of a user terminal A.

FIG. 4 is a functional configuration diagram of a user terminal A.

Figure 5:
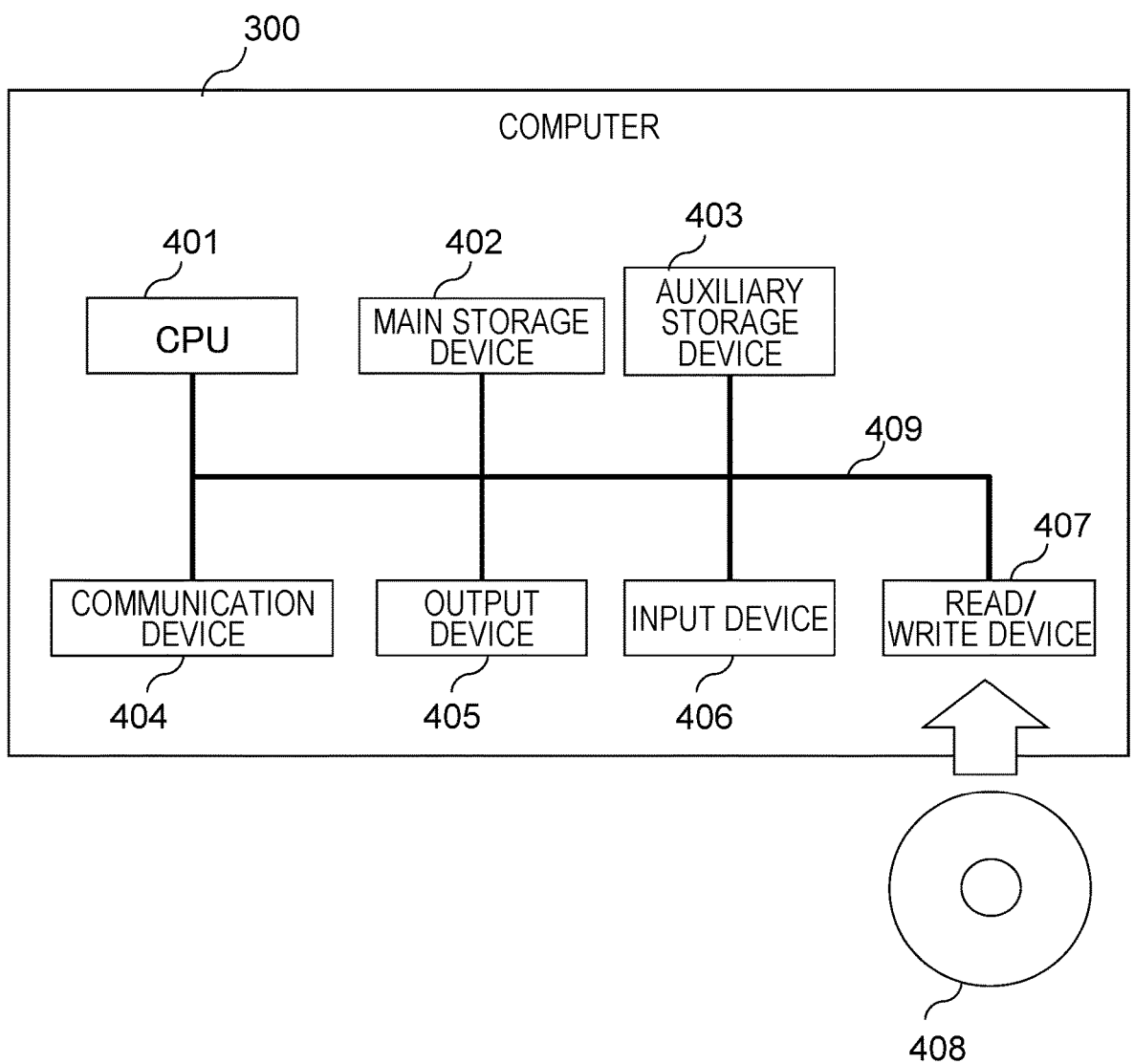
FIG. 5 is a hardware configuration diagram of the user terminal A (computer).

FIG. 5 is a hardware configuration diagram of the user terminal A (computer).

As shown in FIG. 1, the data processing system of the present embodiment includes a user terminal A 300, a user terminal B 400, a key generation server 100, and a data storage server 200 which are connected to each other through a network 60.

The present embodiment assumes an example in which a user A deposits data in the data storage server 200 by using the user terminal A 300, and a user B accesses the data by using the user terminal B 400.

The data storage server 200 is a server for storing user's data, and permitting/authorizing access to the data. For example, the data storage server 200 is a server operated by a business operator engaged in data storage services based on cloud services. An end user who receives the services can upload or download data to or from the data storage server 200 by using the user terminal. Here, the user terminal is a device such as a desktop computer, a notebook computer, a tablet, and a smartphone, which allows an end user to access data in the data storage server 200 through the Internet.

The key generation server 100 is a server that generates a key for encryption necessary for data processing in the present embodiment, and distributes the key to the user terminal of the end user and the data storage server 200.

As a functional configuration shown in FIG. 2, the data storage server 200 includes a control unit 210, a recording unit 220, an input unit 201, an output unit 202, and a communication unit 203.

The input unit 201 and the output unit 202 are units for inputting and outputting information, respectively. The communication unit 203 is a unit for transmitting and receiving data to and from external devices. The control unit 210 is a unit for controlling each unit of the apparatus and executing a program. The recording unit 220 is a unit for storing data and programs.

The control unit 210 includes an overall processing unit 211 and a key replacement processing unit 212.

The overall processing unit 211 controls processing in the data storage server 200, and stores information received via the input unit 201, in the recording unit 220. In addition, the overall processing unit 211 controls transmission and reception of information to and from the user terminals 300 and 400. Furthermore, the overall processing unit 211 performs a process of displaying data on the output unit 202, reads data stored in the recording unit 220, and transmits the data to the user terminals 300 and 400 via the communication unit 203.

The recording unit 220 includes a data recording unit 230 and a temporary information recording unit 250.

The data recording unit 230 stores user data 231. The user data 231 are data to be uploaded from the user terminal, and may have been encrypted or may be stored in plaintext in some cases.

A key recording unit 240 stores a replacement key 241.

The replacement key 241 is a key (to be described below) generated from a user's unique key by a unique group operation.

The temporary information recording unit 250 stores work data temporarily required for processing in the control unit 210.

As shown in FIG. 3, the user terminal A 300 includes a control unit 310, a recording unit 320, an input unit 301, an output unit 302, and a communication unit 303.

The input unit 301 and the output unit 302 are units for inputting and outputting information, respectively. The communication unit 303 is a unit for transmitting and receiving data to and from external devices. The control unit 310 is a unit for controlling each unit of the apparatus and executing a program. The recording unit 320 is a unit for storing data and programs.

The control unit 310 includes an overall processing unit 311, an authenticator generation/encryption processing unit 312, and a decryption/authenticator verification processing unit 313.

The overall processing unit 311 controls processing in the user terminal 300, and stores information received via the input unit 301, in the recording unit 320. In addition, the overall processing unit 311 controls transmission and reception of information to and from the data storage server 200.

Furthermore, the overall processing unit 311 performs a process of displaying data on the output unit 302, and reads data stored in the recording unit 320. Moreover, the overall processing unit 311 causes the authenticator generation/encryption processing unit 312 to generate a message authenticator for the data and to encrypt the data, and also causes the decryption/authenticator verification processing unit 313 to decrypt the encrypted data and to verify the message authenticator. Then, the overall processing unit 311 transmits the data to the data storage server 200 via the communication unit 303.

The recording unit 320 includes a data recording unit 330, a key recording unit 340, and a temporary information recording unit 350.

The data recording unit 330 records user A data 331.

The key recording unit 340 stores a user A unique key 341.

The temporary information recording unit 250 stores work data temporarily required for processing in the control unit 210.

Although the functional configuration of the user terminal B is not shown, the user terminal B has a processing unit in the control unit 310, which accesses other user data stored in the data storage server 200 and verifies the integrity of the data.

As shown in FIG. 4, the key generation server 100 includes a control unit 110, a recording unit 120, an input unit 101, an output unit 102, and a communication unit 103.

The input unit 101 and the output unit 102 are units for inputting and outputting information, respectively. The communication unit 103 is a unit for transmitting and receiving data to and from external devices. The control unit 110 is a unit for controlling each unit of the apparatus and executing a program. The recording unit 120 is a unit for storing data and programs.

The control unit 110 includes an overall processing unit 111, a key generation unit 112, and a replacement key generation unit 113.

The overall processing unit 111 controls processing in the key generation server 100, and stores information received via the input unit 101, in the recording unit 120. In addition, the overall processing unit 111 controls transmission and reception of information to and from the user terminals 300 and 400 and the data storage server 200.

Furthermore, the overall processing unit 111 performs a process of displaying data on the output unit 102, and reads data stored in the recording unit 120. Moreover, the overall processing unit 111 causes the key generation unit 112 to generate a message authenticator generation/verification key and an encryption key, and also causes the replacement key generation unit 113 to generate a replacement key. In addition, the overall processing unit 111 transmits the generated keys to the user terminals 300 and 400, and also transmits the replacement key to the data storage server 200.

The recording unit 120 includes a key recording unit 140 and a temporary information recording unit 150.

The key recording unit 140 stores a user unique key 141 and a replacement key 142.

The temporary information recording unit 150 stores work data temporarily required for processing in the control unit 110.

The above-described user terminal A 300 can be implemented by a general computer 400 which includes, for example, a central processing unit (CPU) 401, a main storage device 402, an auxiliary storage device 403, a read/write device 407, an input device 406, an output device 405, a communication device 404, and a system bus 409, as shown in FIG. 5.

The CPU 401 is a semiconductor device that executes a program on the main storage device 402, as an instruction word. The main storage device 402 is a storage device such as a random access memory (RAM) that stores work data and programs. The auxiliary storage device 403 is a large-capacity data storage device such as a solid state drive (SDD) and a hard disk drive (HDD). The read/write device 407 is a device such as a disk drive that reads and writes information from and to a portable recording medium 408 such as a CD and a DVD. The input device 406 is a device, such as a keyboard and a mouse, that allows a user to input information. The output device 405 is a device for displaying and printing information, such as a display and a printer. The communication device 404 is a device for connecting to a communication network, such as a network interface card (NIC).

For example, the recording unit 320 can be implemented by the CPU 401 using the memory 402 or the auxiliary storage device 403. In addition, it is also possible to implement the control unit 310 and each processing unit included in the control unit 310 by loading, into the memory 402, a predetermined program recorded in the auxiliary storage device 403, and executing the program in the CPU 401. Furthermore, the input unit 301 can be implemented by the CPU 401 using the input device 406. The output unit 302 can be implemented by the CPU 401 using the output device 405. The communication unit 303 can be implemented by the CPU 401 using the communication device 404.

The predetermined program may be recorded in (downloaded into) the auxiliary storage device 403 from the recording medium 408 via the read/write device 407 or from the network via the communication device 404, and then loaded into the memory 402 to be executed by the CPU 401. Additionally, the predetermined program may be directly loaded into the memory 402 from the recording medium 408 via the read/write device 407 or from the network via the communication device 404 to be executed by the CPU 401.

Similarly, the data storage server 200 and the key generation server 100 can also be implemented in the form of a general information processor as shown in FIG. 5.

Next, processing to be performed in the data processing system according to the first embodiment will be described with reference to FIGS. 6 to 13.

Figure 6:
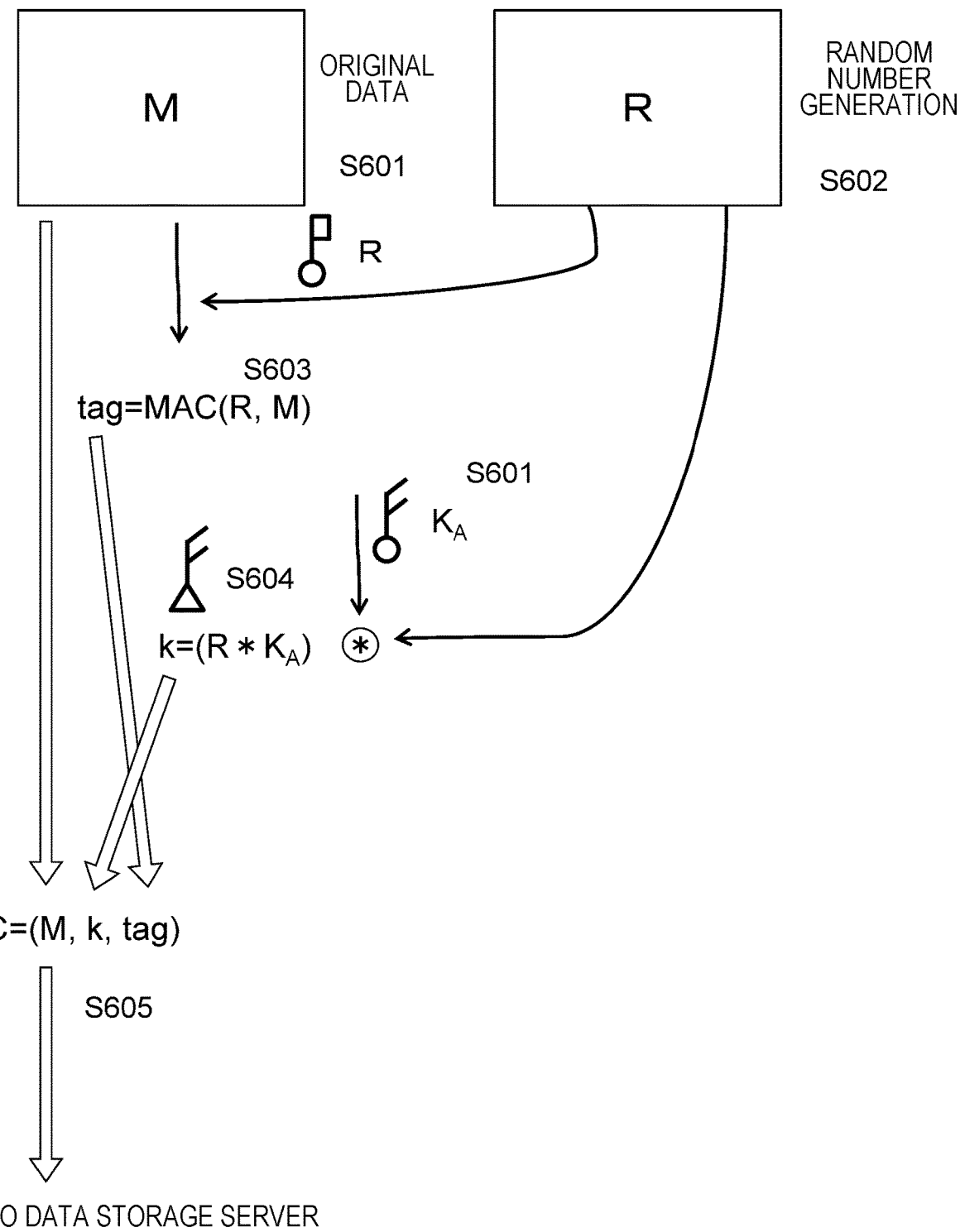
FIG. 6 is a schematic diagram showing a process in which the user terminal A generates a set of data, key information, and a message authenticator.

FIG. 6 is a schematic diagram showing a process in which the user terminal A generates a set of data, key information, and a message authenticator.

Figure 7:
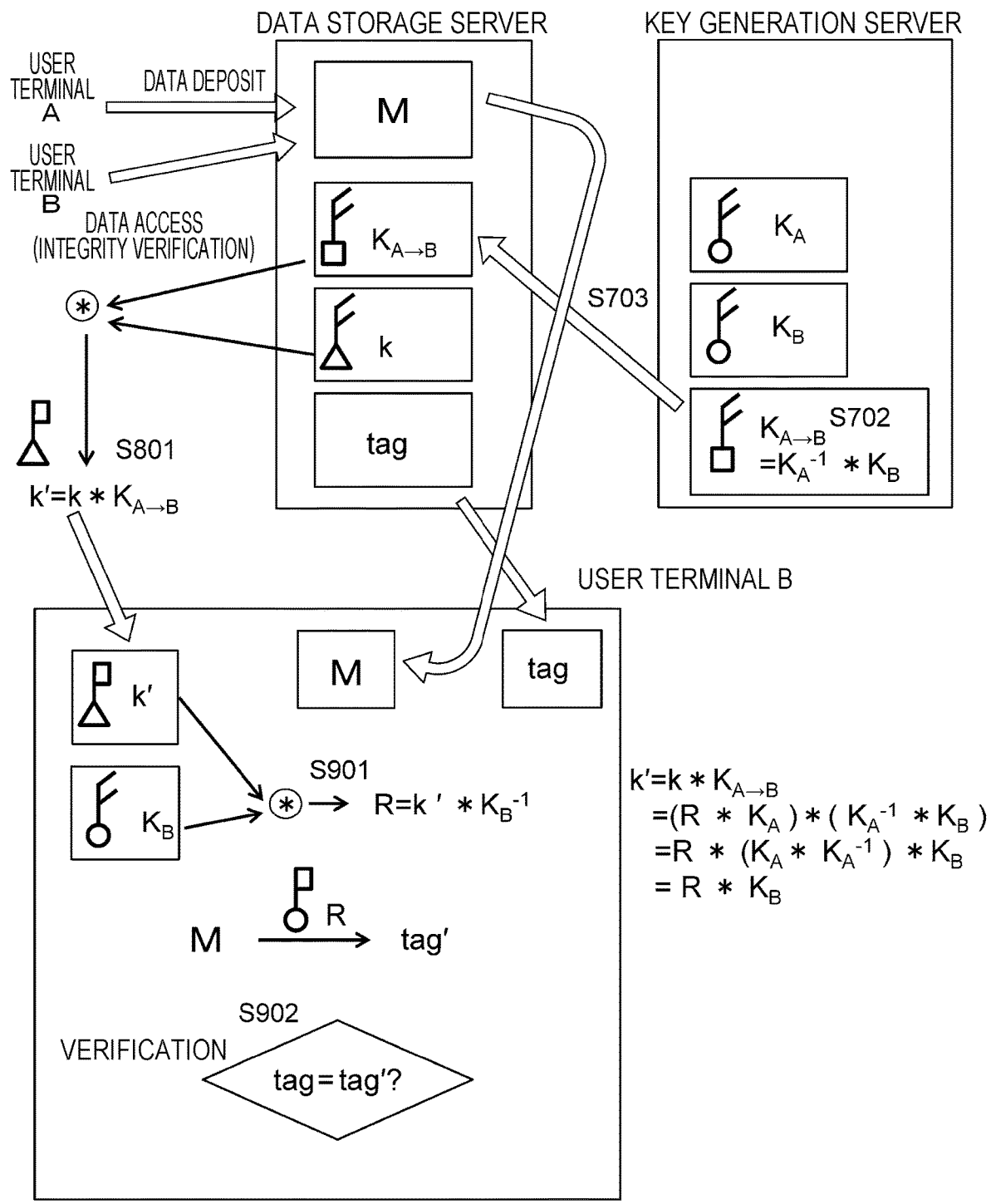
FIG. 7 is a schematic diagram showing a process in which a user terminal B verifies the data integrity of data stored in the data storage server.

FIG. 7 is a schematic diagram showing a process in which the user terminal B verifies the data integrity of data stored in the data storage server.

Figure 8:
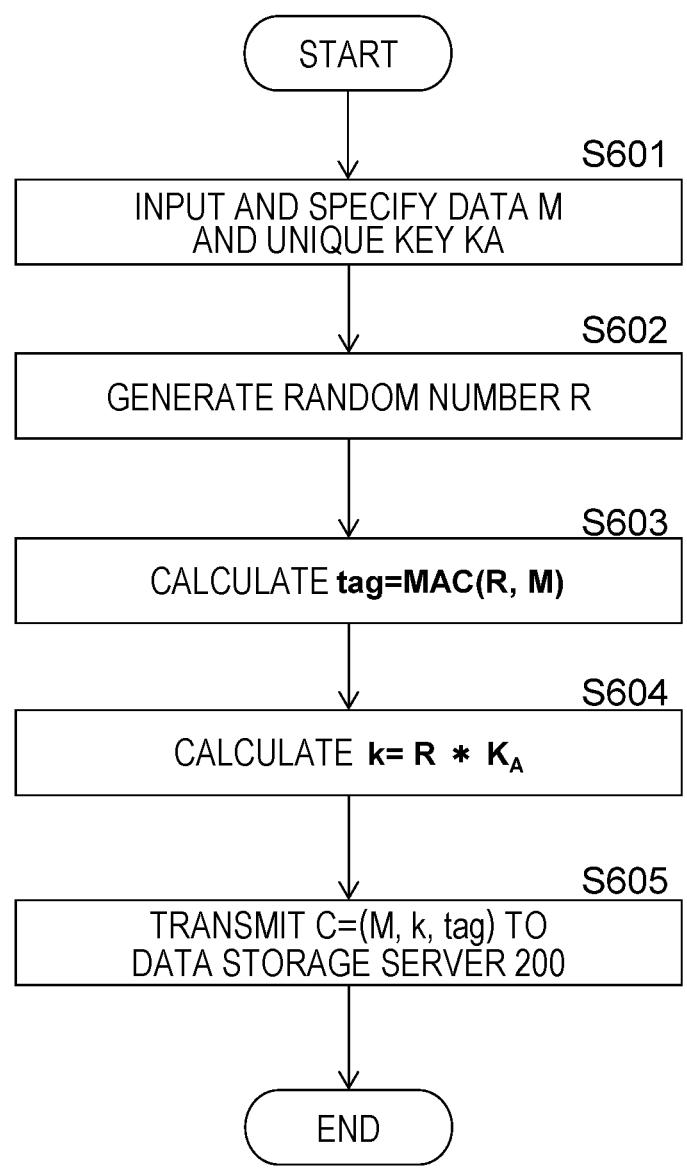
FIG. 8 is a flowchart showing a process in which the user terminal A generates the set of data, key information, and a message authenticator, and transmits the set to the data storage server.

FIG. 8 is a flowchart showing a process in which the user terminal A generates the set of data, key information, and a message authenticator, and transmits the set to the data storage server.

Figure 9:
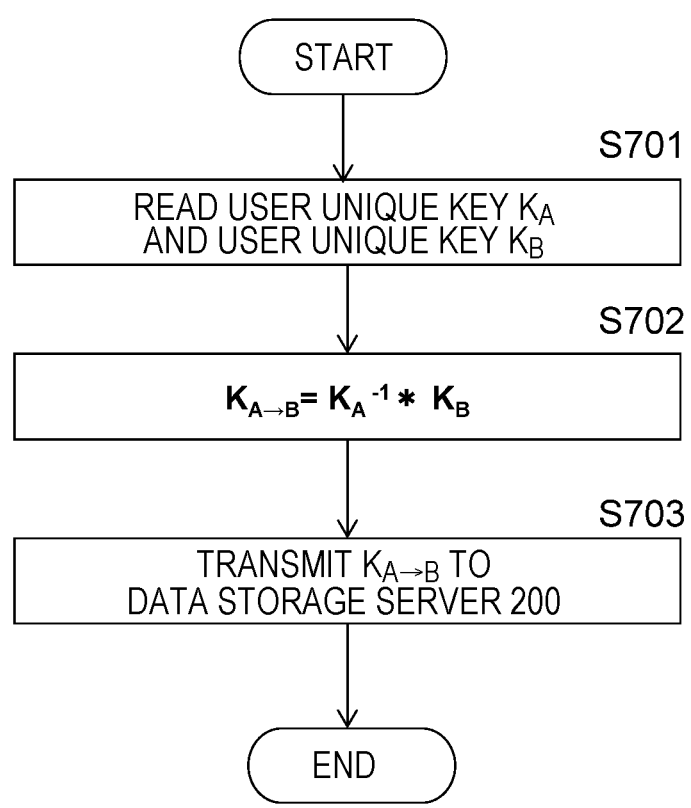
FIG. 9 is a flowchart showing a process in which the key generation server generates a replacement key, and transmits it to the data storage server.

FIG. 9 is a flowchart showing a process in which the key generation server generates a replacement key, and transmits it to the data storage server.

Figure 10:
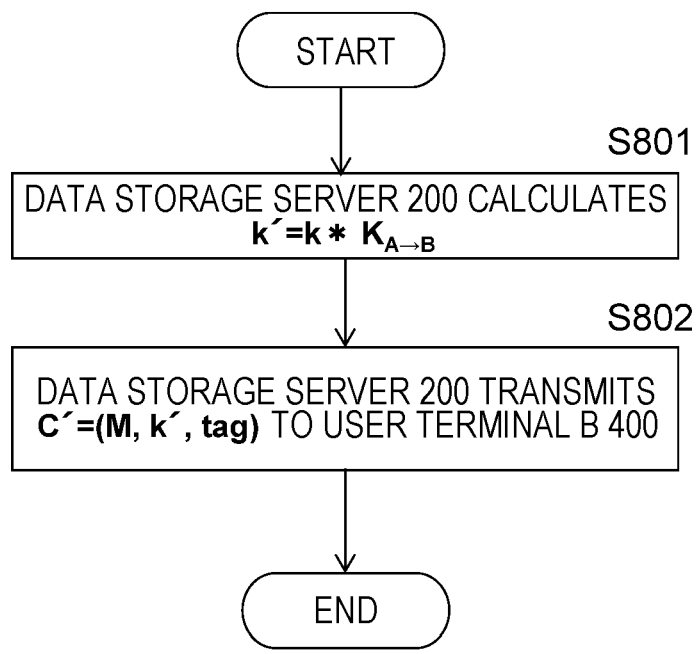
FIG. 10 is a flowchart showing a process in which the data storage server generates a set of data, key information, and a message authenticator, and transmits the set to the user terminal B.

FIG. 10 is a flowchart showing a process in which the data storage server generates a set of data, key information, and a message authenticator, and transmits the set to the user terminal B.

Figure 11:
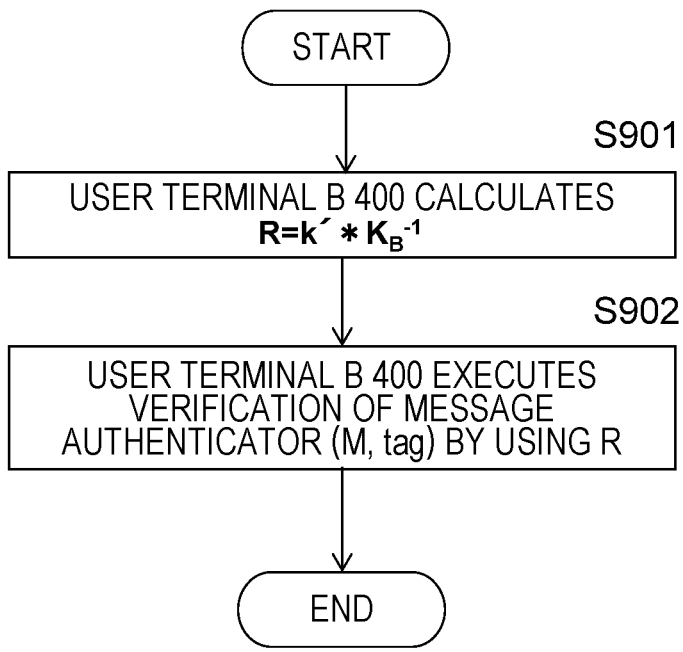
FIG. 11 is a flowchart showing a process in which the user terminal B verifies data integrity.

FIG. 11 is a flowchart showing a process in which the user terminal B verifies data integrity.

Figure 12:
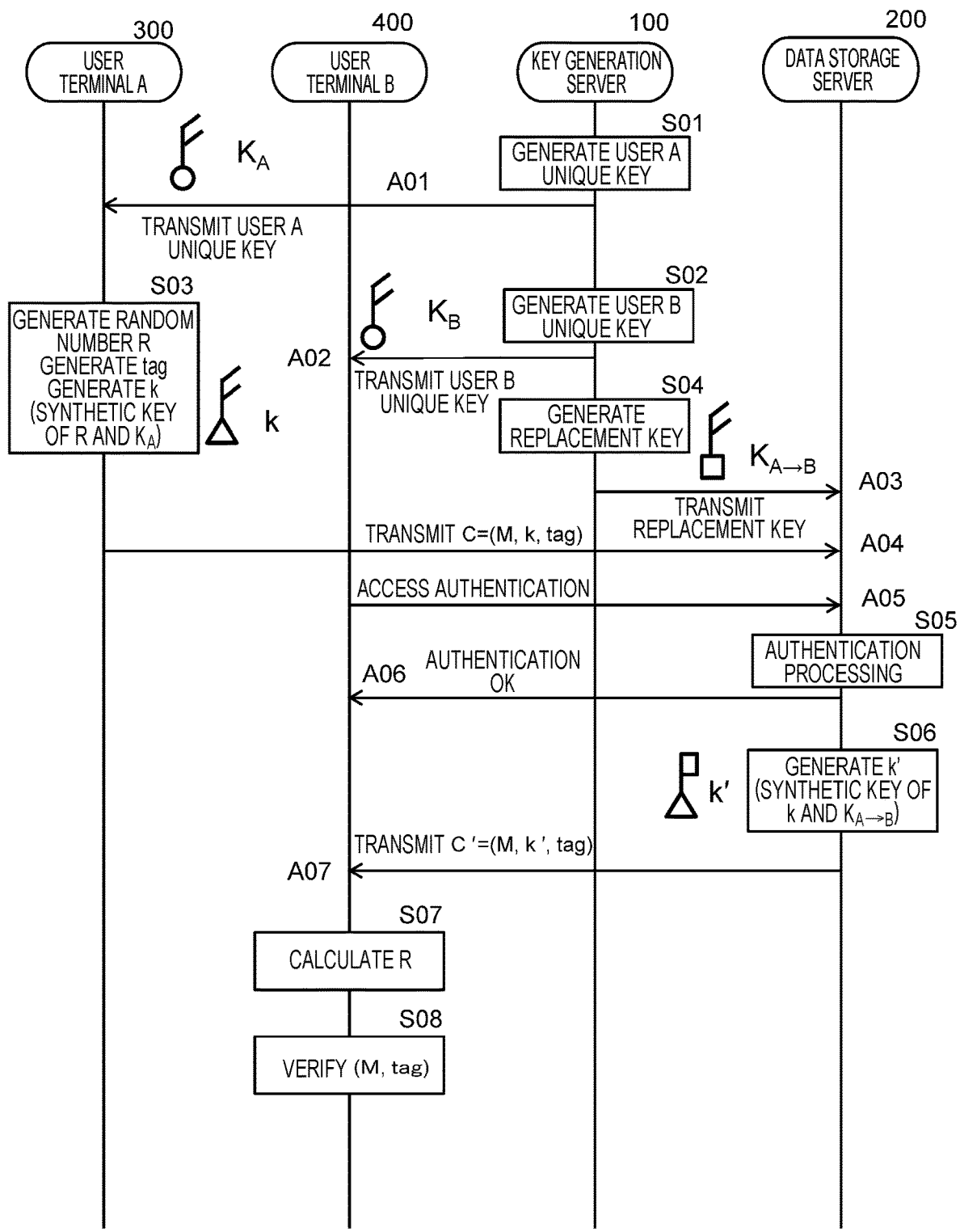
FIG. 12 is a sequence diagram showing an entire process of processing to be performed in the data processing system.

FIG. 12 is a sequence diagram showing an entire process of processing to be performed in the data processing system.

Figure 13:
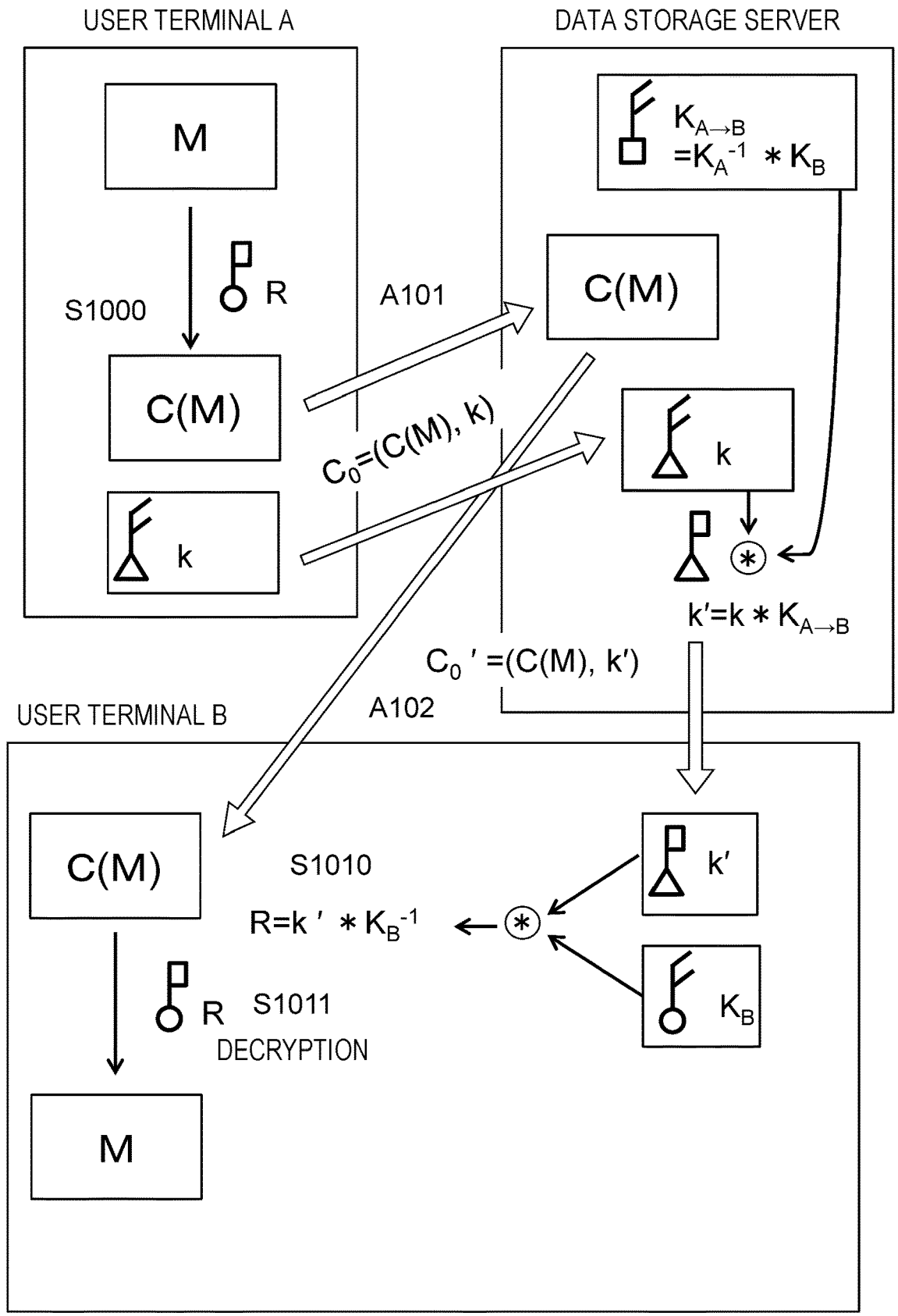
FIG. 13 is a schematic diagram of processing to be performed when encrypted data are uploaded from the user terminal A.

FIG. 13 is a schematic diagram of processing to be performed when encrypted data are uploaded from the user terminal A.

In the present embodiment, data integrity of relevant data is to be verified when the user A uploads data M to the data storage server 200 from the user terminal A 300, and the user B downloads the data M by using the user terminal B 400 to use the data M.

First, the key generation server 100 generates a user A unique key (denoted by $K_A$) (S01 in FIG. 12), and transmits it to the user terminal A 300 (A01). Similarly, the key generation server 100 generates a user B unique key (denoted by $K_B$) (S02), and transmits it to the user terminal B 400 (A02). The user A unique key $K_A$ and the user B unique key $K_B$ may be randomly generated with a bit string of a predetermined length.

The user A inputs the data M to the user terminal A or specifies the stored data M, and specify the user A unique key $K_A$ transmitted by the key generation server 100 (S601).

Next, the user terminal A 300 generates a random number R (S602 and S03).

Then, the user terminal A 300 calculates a message authenticator (denoted by tag=MAC(R, M)) which uses the generated random number R as a key (S603 and S03). Here, the message authenticator to be used in S603 may be a generally used one, such as one using a hash function and one using a block cipher.

Next, the user terminal A 300 calculates k=(R*$K_A$) which is a synthetic key of the random number R and the user A unique key $K_A$ (S604 and S03). Here, the symbol * represents any given group operation defined on a set of bit strings (which may be bit strings having fixed lengths). For example, it is possible to use bitwise exclusive OR (XOR).

Next, the user terminal A 300 transmits C=(M, k, tag) to the data storage server 200 (A04). Here, "(,)" represents a combination of bit strings, and the order may be changed.

Then, the key generation server 100 reads the user A unique key $K_A$ and the user B unique key $K_B$ recorded in the unique key 141 of the key recording unit 140 (S701), and generates a replacement key (denoted by $K_{A \to B}$) (S04). The replacement key $K_{A \to B}$ is calculated by using $(K_A)^{-1}*K_B$ (S702). Here, $(K_A)^{-1}$ is the inverse element of $K_A$ in the group operation *. It should be noted that in the case where * is a bitwise exclusive OR, the following expression holds: $KA^{-1}=KA$. Then, the key generation server 100 transmits the generated replacement key $K_{A \to B}$ to the data storage server 200 (S703 and A03). It should be noted that the key generation server 100 may record and store the generated replacement key $K_{A \to B}$ in the key recording unit 120.

Next, the procedure for the user B to acquire data uploaded to the data storage server 200 and verify the integrity of the data will be described.

The user B performs access authentication from the user terminal B 400 (A05). The data storage server 200 performs authentication processing (S05). When it is determined that the user B has data access authority, the data storage server 200 provides the notification "authentication OK" (A06). Examples of means of authentication include password authentication and biometric authentication.

Next, the data storage server 200 calculates k'=k*$K_{A \to B}$ by using the replacement key $K_A$+B (S801 and S06).

Then, the data storage server 200 transmits C'=(M, k', tag) to the user terminal B 400 (S802 and A07).

Upon receiving this, the user terminal B 400 calculates a random number R=k'*$K_B^{-1}$ (S901 and S07), and verifies a message authenticator (M, tag) by using the random number R (S902 and S08). Various measures may be taken according to the result. For example, in the case where the message authenticator is determined to be not good as a result of verification, retransmission to a replacement server may be performed, or a request for verification of data integrity may be issued to the replacement server.

The random number R=k'*$K_B^{-1}$ is obtained in S805 when the following expression holds:

$$k'=k*K_{A \to B}=(R*K_A)*(K_A^{-1}*K_B)= R*(K_A*K_A^{-1})*K_B=R*K_B.$$

Accordingly, it is possible to obtain a desired expression by multiplying both sides by $K_B^{-1}$ from the left.

Then, it is possible to verify the integrity of the data M in the user terminal B 400 by generating a message authenticator tag' from M and R, and determining whether the message authenticator tag' coincides with the received tag.

In addition, the user A may encrypt the data M and store the encrypted data M in the data storage server 200 as shown in FIG. 13. Here, it is assumed that the user terminal A 300 generates the random number R, and encrypts the data M with the random number R (S1000) (encrypted data obtained by encryption of the data M is denoted by C(M)).

Then, the user terminal A transmits, to the data storage server 200, $C_0=(C(M), k)$ which is a composite of the encrypted data C(M) and the synthetic key k (A101). The data storage server 200 generates $C'_0=(M, k')$, and transmits it to the user terminal B 400 (A102). Here, the definitions of the replacement key $K_{A \to B} = K_A^{-1} * K_B$, the synthetic key $k = R * K_A$, and the synthetic key $k' = k * K_{A \to B}$ are exactly the same as above.

Similarly to the above, the user B terminal calculates the random number $R = k' * K_B^{-1}$ to be used as a key, by using the received k' and its own user B unique key $K_B$ (S1010), so that the received C(M) can be decrypted (S1011).

Thus, the method of the present embodiment is applicable not only to verification of data integrity by means of a message authenticator as described above, but also to general encryption using common key cryptography such as the advanced encryption standard (AES), or decryption in the case of authentication encryption which allows message authentication and encryption to be simultaneously executed.

As described above, according to the present embodiment, a business operator entrusted with storage of data (an operator of a data storage server) can only see the data and cipher texts generated according to the re-encryption method, and cannot see users' unique keys individually. Accordingly, it is impossible for the business operator to falsify the stored data or derive plaintext in the case where the data are stored after being encrypted. However, with the technique of replacing a key with the replacement key, it is possible to convert each user's data into data capable of being verified or decrypted by another user without disclosing, to the another user, information on each user's unique key. Therefore, each user can deposit information in an external contractor without worrying about falsification of information or information leakage. In addition, it is possible for each user to delegate all calculations necessary for replacement of a key to the external contractor as a service provider, by simply performing additional communication of a fixed length smaller than a data body.

Second Embodiment

A second embodiment according to the present invention will be described below with reference to FIGS. 14A and 14B.

Figure 14A:
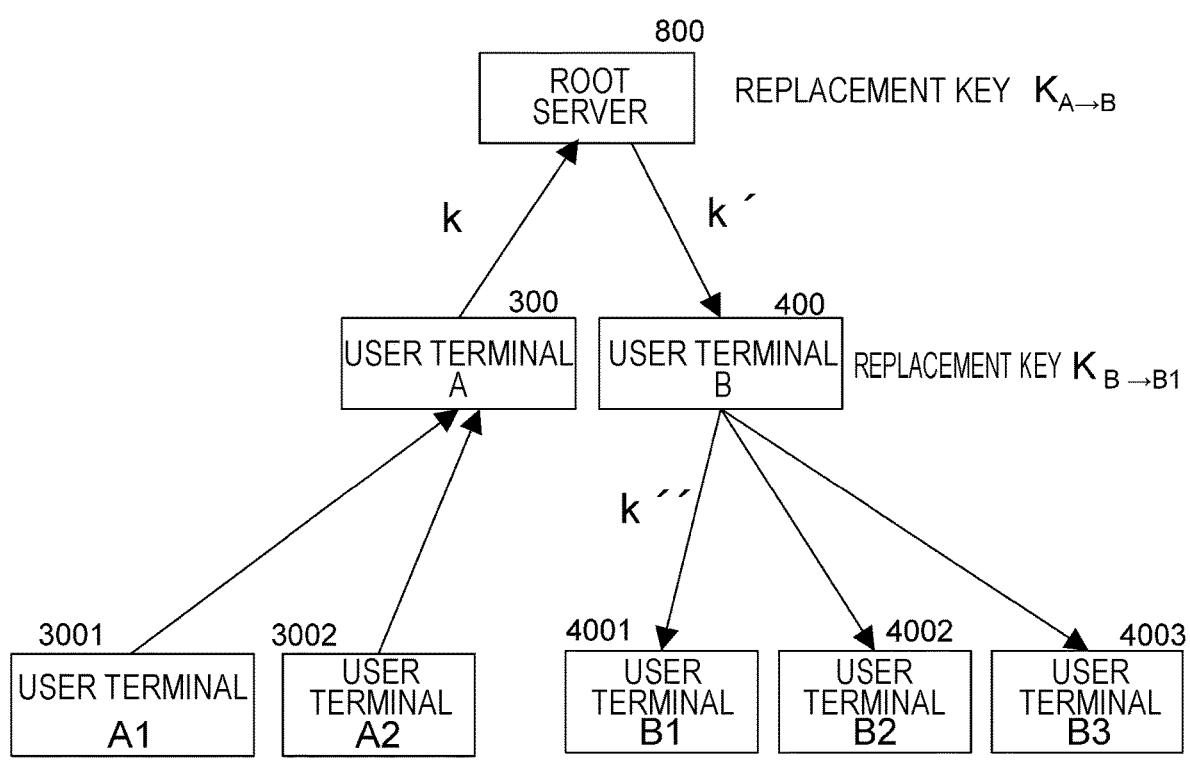
FIG. 14A is a diagram describing a hierarchical structure of data and key transfer in a second embodiment (part 1).
Figure 14B:
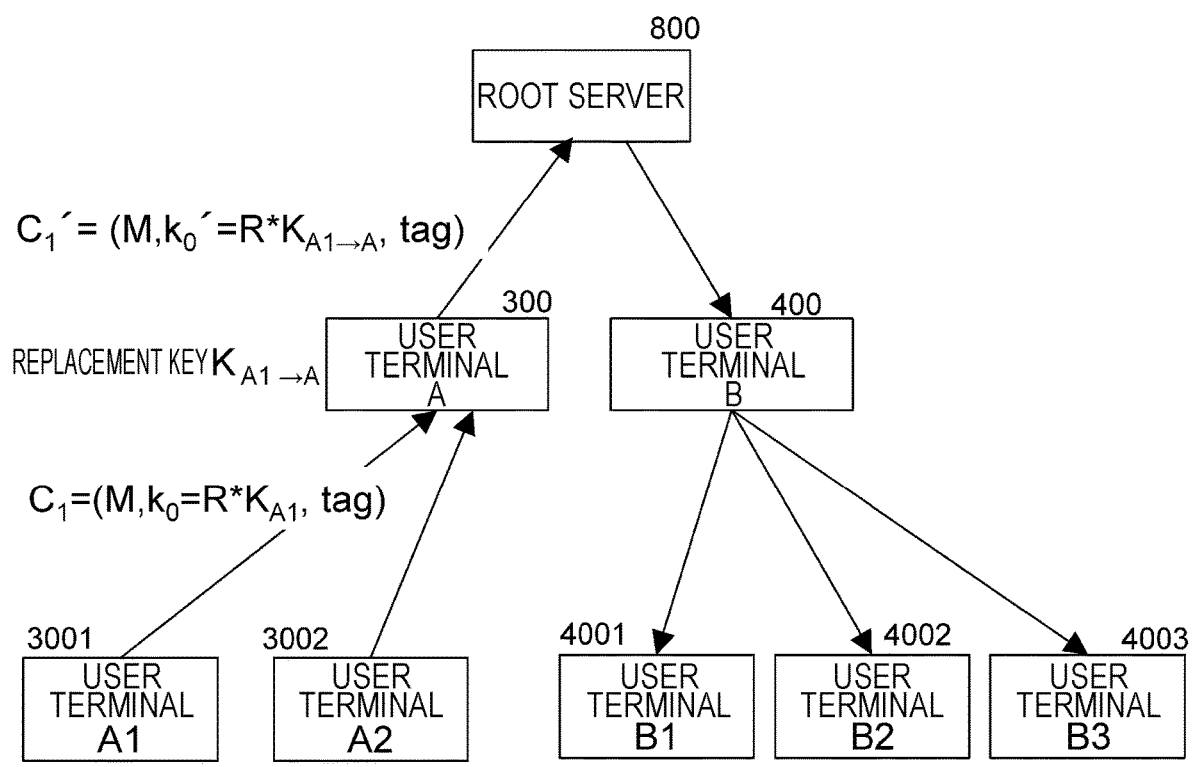
FIG. 14B is a diagram describing a hierarchical structure of data and key transfer in the second embodiment (part 2).

FIGS. 14A and 14B are diagrams describing hierarchical structures of data and key transfer in the second embodiment.

In the present embodiment, a hierarchical tree structure is adopted as shown in FIG. N, in which a root server 800 is located at a place corresponding to a root, and a user receives services at each node.

The root server 800 of the present embodiment serves as an end point of an upward flow of depositing data, and also serves as a starting point for distributing data to a lower hierarchy. Furthermore, the root server 800 also has a function of transferring, to a lower hierarchy, a key transferred from a lower hierarchy.

The root server 800 may generate and distribute a unique key and a replacement key of each node. Alternatively, a unique key and a replacement key of each node may be distributed by a key generation server separately provided as in the first embodiment.

The data processing system of the present embodiment assumes the following rules.

(Rule 1) Each node has a unique key which is unique to the node.

(Rule 2) Each node is capable of transferring data and key information to a node connected thereto, and knows (can use) a replacement key for the transfer destination.

In addition, it is assumed that a group operation * is common to all nodes.

Under the rules, it is assumed that the root server 800 shown in FIG. 14A knows a replacement key from a user terminal A to a user terminal B. Furthermore, it is assumed that the user terminal B 400 knows replacement keys for transfer destinations of a user terminal B1 (4001), a user terminal B1 (4002), and a user terminal B3 (4003) which are nodes in a lower hierarchy.

In this case, when a key k is transferred from a user A to the root server 800, the root server 800 converts the key k into $k' = k * K_A + B$ by using a replacement key $K_{A \to B} = K_A^{-1} * K_B$, and transmits key information.

Then, when the user terminal B 400 transmits the key information to, for example, the user terminal B1 (4001), the user terminal B 400 transmits the key information after conversion into $k'' = k * K_{B \to B1}$ by using a replacement key $K_{B \to B1} = K_B^{-1} * K_{B1}$.

As a result, when receiving transmitted data, the user B1 (4001) can verify the integrity of the data by means of a message authenticator, and decrypt encrypted data, with its own unique key $K_B$.

Even in the case of depositing data, it is also possible to transfer key information between nodes of the tree by applying the following rule, that is, (Rule 2') instead of (Rule 2).

(Rule 2') Each node is capable of transferring data and key information to a node connected thereto, and a node of the transfer destination knows (can use) a replacement key from the transfer source.

Under this premise, it is assumed that a user terminal A 300 knows a replacement key at the time when data and key information are transmitted from a user terminal A1 (3001) and a user terminal A2 (3002).

In this case, it is assumed that for example, the user terminal A1 (3001) deposits data M in the user terminal A 300 of an upper node, and the user terminal A 300 further deposits the data in the root server 800.

The user terminal A1 (3001) generates a random number R, and creates a synthetic key $k_0 = R * K_{A1}$ (corresponding to S602 in FIG. 6 of the first embodiment). Next, the user terminal A1 (3001) calculates a message authenticator tag=MAC(R, M) (corresponding to S603 in FIG. 6 of the first embodiment), and transmits $C_1 = (M, k_0, tag)$ to the user terminal A 300.

The user terminal A 300 generates a synthetic key $k'_0 = k_0 * K_{A1-A}$ by using a replacement key $K_{A1-A} = K_{A1}^{-1} * K_A$, and transmits $C_1' = (k_0', tag)$ to the root server 800.

In the case of utilizing key information in a hierarchical system having such a tree structure, delegating management of all replacement keys to the root server 800 may enormously increase a processing load when, for example, there exist a huge number of terminals such as the user terminal A1 (3001) and the user terminal A2 (3002), which are terminal sensor nodes. In this case, it is possible to reduce the number of replacement keys to be handled by the root server 800 by placing the user terminal A 300 in charge of several child nodes (for example, the user terminal A1 (3001) and the user terminal A2 (3002) as shown in the drawing), and by causing the user terminal A 300 to replace a key with its own key and perform transmission to the root server 800.

Furthermore, while a three-stage tree structure has been described in FIGS. 14A and 14B, it is possible to exponentially reduce the number of replacement keys to be managed by the root server 800 by further increasing the number of stages.

In addition, the method of the present embodiment is applicable not only to verification of data integrity by means of a message authenticator as described above, but also to general encryption using common key cryptography such as AES, or decryption in the case of authentication encryption which allows message authentication and encryption to be simultaneously executed.

REFERENCE SIGNS LIST

60 network
100 key generation server
200 data storage server
201 input unit
202 output unit
203 communication unit
210 control unit
211 overall processing unit
212 key replacement processing unit
220 recording unit
230 data recording unit
231 user data
240 key recording unit
250 temporary information recording unit
300 user terminal A
301 input unit
302 output unit
303 communication unit
310 control unit
311 overall processing unit
312 authenticator generation/encryption processing unit
313 decryption/authenticator verification processing unit
320 recording unit
330 data recording unit
340 key recording unit
341 unique key
350 temporary information recording unit
400 user terminal B
3001, 3002, 4001 to 4003 user terminal
101 input unit
102 output unit
103 communication unit
110 control unit
111 overall processing unit
112 key generation unit
113 replacement key generation unit
120 recording unit
140 key recording unit
141 unique key
142 replacement key
150 temporary information recording unit

The invention claimed is:

1. A data processing system comprising a first user terminal, a server, and a second user terminal, wherein
the first user terminal is configured to upload data to the server,
the second user terminal is configured to access the data from the server,
the first user terminal and the second user terminal have a first unique key and a second unique key, respectively,
the server has a replacement key,
the first user terminal generates a temporary key,
the first user terminal generates a message authenticator by using the data and the temporary key,
the first user terminal generates a first synthetic key by using the temporary key and the first unique key,
the first user terminal transmits the data, the first synthetic key, and the message authenticator to the server,
the server generates a second synthetic key from the received first synthetic key and the replacement key,
the server transmits the data, the second synthetic key, and the message authenticator to the second user terminal,
the second user terminal generates the temporary key by using the received second synthetic key and the second unique key, and
the second user terminal generates a message authenticator by using the data and the generated temporary key, and determines integrity of the received data by comparing the generated message authenticator and the received message authenticator.

2. The data processing system according to claim 1, wherein
a group operation * is defined in a data space in which the first unique key, the second unique key, the replacement key, the temporary key, the first synthetic key, and the second synthetic key are defined,
the first synthetic key is calculated by performing a group operation * of the temporary key and the first unique key,
the replacement key is calculated by performing a group operation * of an inverse element of the first synthetic key and the second unique key, and
the second synthetic key is calculated by performing a group operation * of the first synthetic key and the replacement key.

3. A data processing system comprising a first user terminal, a server, and a second user terminal, wherein
the first user terminal is configured to upload data to the server,
the second user terminal is configured to access the data from the server,
the first terminal and the second terminal have a first unique key and a second unique key, respectively,
the server has a replacement key,
the first terminal generates a temporary key,
the first terminal generates encrypted data from plaintext data by using the temporary key,
the first terminal generates a first synthetic key by using the temporary key and the first unique key,
the first terminal transmits the encrypted data and the first synthetic key to the server,
the server generates a second synthetic key from the received first synthetic key and the replacement key,
the server transmits the encrypted data and the second synthetic key to the second terminal,
the second terminal generates the temporary key by using the received second synthetic key and the second unique key, and the second terminal decrypts the encrypted data with the generated temporary key.

4. The data processing system according to claim 3, wherein
- a group operation * is defined in a data space in which the first unique key, the second unique key, the replacement key, the temporary key, the first synthetic key, and the second synthetic key are defined,
- the first synthetic key is calculated by performing a group operation * of the temporary key and the first unique key,
- the replacement key is calculated by performing a group operation * of an inverse element of the first synthetic key and the second unique key, and
- the second synthetic key is calculated by performing a group operation * of the first synthetic key and the replacement key.

* * * * *